United States Patent

[11] 3,568,576

| [72] | Inventors | Michael Lehmacher<br>Unterdorf Str.;<br>Hans Lehmacher, Beckergasse, Mondorf U<br>Troisdorf, Germany |
|---|---|---|
| [21] | Appl. No. | 739,559 |
| [22] | Filed | June 24, 1968 |
| [45] | Patented | Mar. 9, 1971 |
| [32] | Priority | July 1, 1967, July 28, 1967 |
| [33] | | Germany |
| [31] | | 56890 and 57096 |

[54] METHOD OF PRODUCING CARRIER BAGS
6 Claims, 27 Drawing Figs.

[52] U.S. Cl. ................................................. 93/35,
93/1, 93/33, 93/58
[51] Int. Cl. .................................................. B31b 49/04,
B31b 1/86, B31b 1/18
[50] Field of Search ........................................ 93/35 (DS),
(H), (PCO), 58.5&(.6), 1 (G), 33 (H)

[56] References Cited
UNITED STATES PATENTS

| 1,671,050 | 5/1928 | Snyder | 93/35 |
|---|---|---|---|
| 3,362,302 | 1/1968 | Friedman | 93/35 |
| 3,367,085 | 2/1968 | Parsons | 93/35 |
| 3,397,623 | 8/1968 | Forrer | 93/58.5X |
| 3,440,124 | 4/1969 | Schwarzkopf | 93/35 |
| Re. 26,075 | 9/1966 | Canno | 93/58 |
| 3,395,622 | 8/1968 | Kugler | 93/33 |
| 3,406,610 | 10/1968 | Golden | 93/33 |
| 3,196,757 | 7/1965 | Samways | 93/35 |

Primary Examiner—Wayne A. Morse, Jr.
Attorney—Holman, Glascock, Downing and Seebold ABSTRACT: A method of producing a carrier bag from synthetic thermoplastic foil having a reinforcement at the upper edge of the carrier bag and punched grip apertures passing through both walls of the carrier bag. The foil can either be a flat band or in tubular form which is longitudinally slit. Furthermore, reinforcing inserts may be intermittently spaced along the longitudinal edges of the foil. The edges of the foil may then be longitudinally slit so as to form longitudinal strips, which in turn are bent around the cut edge of the foil and welded to the foil. If the foil has not been doubled onto itself, it is then folded along its longitudinal medium line, and the folded edges are welded and transverse welds and cuts are made along the foil to form the carrier bags.

Patented March 9, 1971
3,568,576
5 Sheets-Sheet 1
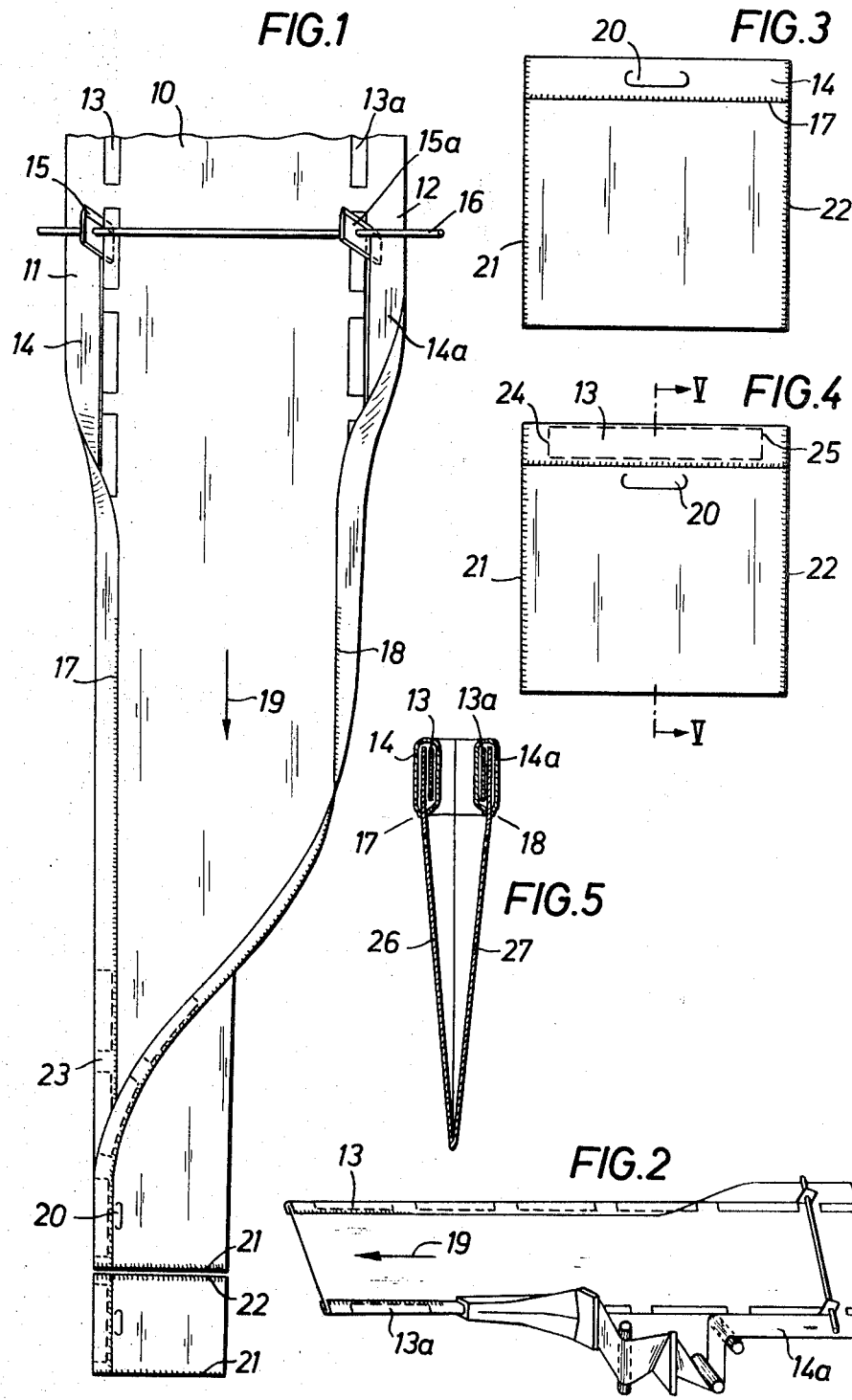

Patented March 9, 1971 3,568,576

INVENTOR

BY

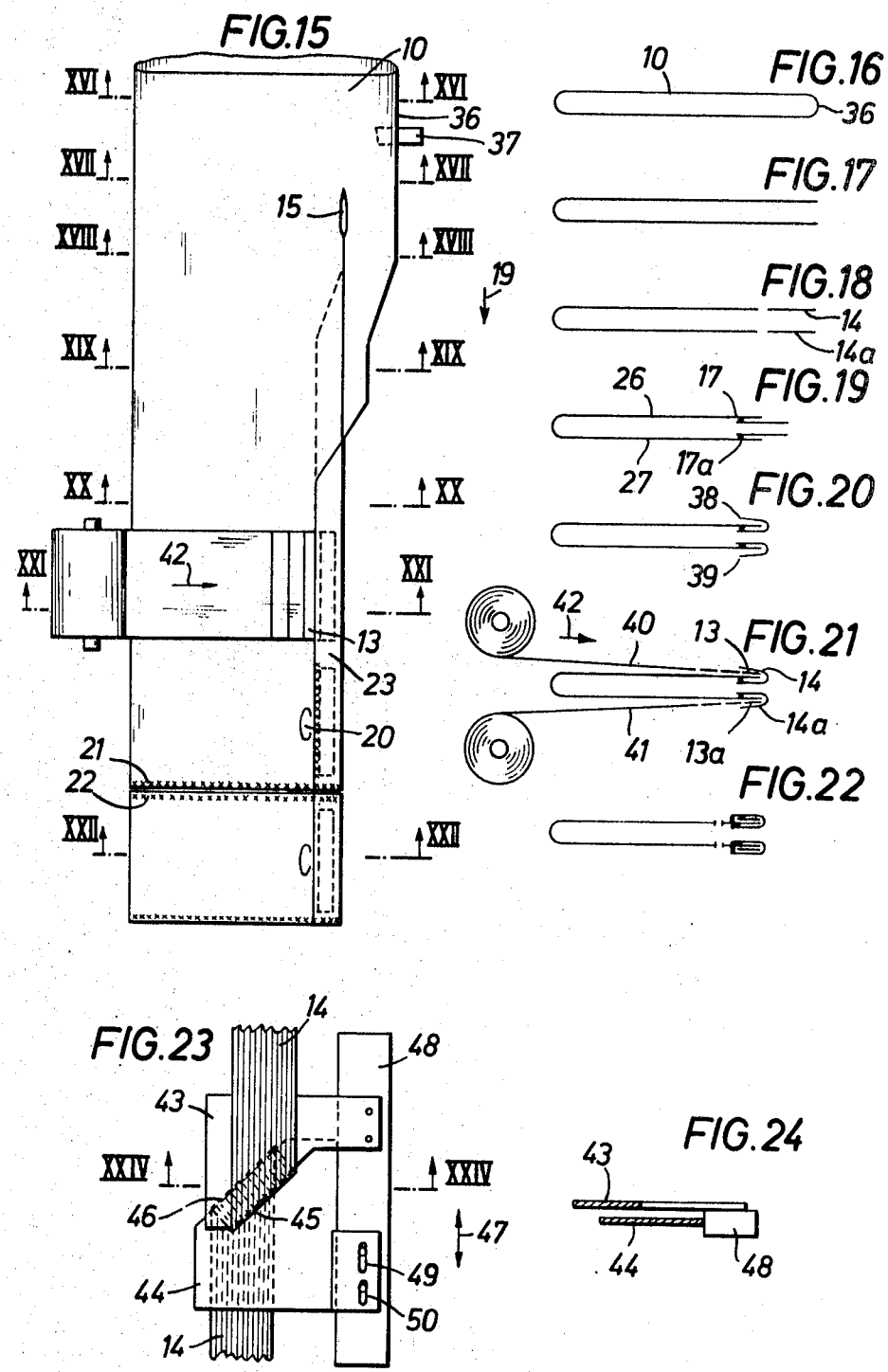

Patented March 9, 1971 3,568,576

METHOD OF PRODUCING CARRIER BAGS

It is already known to provide carrier bags with reinforcements at their open upper edge. These reinforcements in the form of strips from cardboard are either glued-on or it is used a cardboard coated with a synthetic thermoplastic material so that it may likewise be affixed by welding to a carrier bag by the application of pressure and heat. Normally, these reinforcements of the open upper edge are applied after manufacture of the carrier bag. In the hitherto known carrier bags, also reinforcing inserts are affixed to the carrier bag by welding or pasting. Besides these reinforcing inserts from cardboard or stiff synthetic thermoplastic foil, it has also been proposed to affix reinforcing strips from synthetic thermoplastic foils by welding, these reinforcing strips consisting of a synthetic thermoplastic material which is different from that of the carrier bag. Special delivery spools for the reinforcing strips are therefore necessary which have to be continuously exchanged on the production machine as soon as they are exhausted. The production machine necessitates besides the structural design a considerable wasting of time.

The invention starts from the problem to provide carrier bags which may be produced by very simple means and require no reinforcing strips obtained from a special foil. Besides the reinforcement of the upper edge of the carrier bag by reinforcing strips from a synthetic thermoplastic foil, the carrier bags shall further be provided with reinforcing inserts so that they have a particularly high carrier strength.

The present invention starts especially from the problem to produce carrier bags with reinforcements of the upper gripping edge which are provided with punched out grip apertures and which can be mechanically produced in a particularly simple manner. The main object of the invention is to set forth a basic method wherein a plurality of modifications of such carrier bags may be economically produced.

In a method for producing a carrier bag from synthetic thermoplastic foil with a reinforcement at the upper edge of the carrier bag and with punched out grip apertures passing through both walls of the carrier bag, it is proposed according to the invention for the solution of the problem that the two edges of the edges band are continuously folded towards the outside and the edges of the folds are affixed to the foil band by welding, whereupon the grip apertures are punched out and finally transverse closure welds with an intermediate separating cut are effected for separating the finished carrier bag from the foil band.

As particularly advantageous, there is proposed according to another feature of the invention that by continuous cutting at the edges of the foil band strips are separated which subsequently are folded in a U-shaped manner and are then slid over the new edge of the foil band formed by such continuous cutting. The new edge is engaged with the folded U-shaped foil strips up to the folding line of the foil band whereupon the grip apertures are punched out, and finally transverse closure welds with an intermediate separating cut are effected for separating the finished carrier bag from the foil band.

According to a further feature of the invention there is additionally provided between the walls of the carrier bag and the reinforcing strips at the open upper edge a reinforcing insert which is not affixed to the foils by welding. The material these reinforcing inserts may therefore be various stiff materials since their weldability with the foil is not important.

In the drawings are illustrated, by way of example, several, embodiments of the invention. The same is however not limited to the illustrated embodiments so that further modifications may be made within the scope of the invention.

FIG. 1 is a top view and perspective illustration of the method according to the invention for producing of carrier bags with reinforcing strips and additional reinforcing inserts;

FIG. 2 is a perspective illustration of a folding device;

FIG. 3 is a side view of a carrier bag with reinforcing strips;

FIG. 4 is a side view of a carrier bag with reinforcing strips and reinforcing inserts;

FIG. 5 is a longitudinal section on the line V–V of FIG. 4;

FIG. 15 shows in a top view and in essentially diagrammatic manner the production of carrier bags, starting from a hose of synthetic thermoplastic material;

FIG. 16 shows the hose in cross section on the line XVI–XVI of FIG. 15;

FIG. 17 shows the half-hose in cross section on the line XVII–XVII of FIG. 15;

FIG. 18 shows the half-hose in cross section on the line XVIII–XVIII of FIG. 15;

FIG. 19 shows the carrier bag in cross section on the line XIX–XIX of FIG. 15;

FIG. 20 shows the carrier bag in cross section on the line XX–XX of FIG. 15;

FIG. 21 shows the carrier bag in cross section on the line XXI–XXI of FIG. 15;

FIG. 22 shows the carrier bag in cross section on the line XXII–XXII of FIG. 15;

FIG. 23 is a top view of the device for insertion of a reinforcing insert into the reinforcing strip separated from the edge of the half-hose;

FIG. 24 is a vertical section on the line XXIV–XXIV of FIG. 23;

Figure 6:
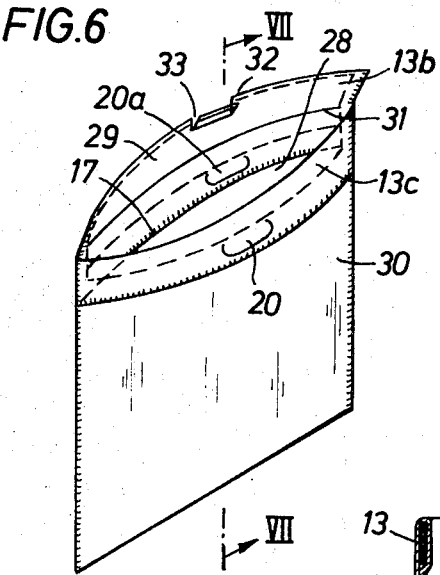
FIG. 6 is a perspective view of a carrier bag made from textile material.
Figure 7:
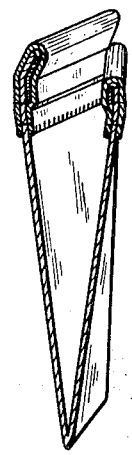
FIG. 7 is a longitudinal section on the line VII–VII of FIG. 6.

FIG. 1 shows a flat band 10 made from synthetic thermoplastic material which is preferably printed. Within the edges 11, 12 and at a distance therefrom are continuously applied reinforcing inserts 13, 13a which have a predetermined length and a predetermined width. The length and width of these reinforcing inserts 13, 13a depend on the kind of carrier bag to be produced. According to FIG. 1, the reinforcing inserts 13, 13a are applied at a distance from the above-mentioned edges 11, 12 of the flat band which corresponds at least to their double width, since in this illustrated embodiments, there are to be separated foil strips 14, 14a at both edges of the band. For this purpose there is provided two cutter 15, 15a which are fixed to a crossbar 16 extending transverse to the foil band 10 in such a manner that their lateral distance from one another may be adjusted. The cuts for separating the foil strips 14, 14a are carried out immediately adjacent to the outer edges of the reinforcing inserts 13, 13a. The foil strip 14, 14a so formed are continuously folded along their median longitudinal axis in a U-shaped manner and slid over the edge of the foil band provided with the reinforcing inserts. Thereupon the edges of strips 14, 14a are connected with the upper and lower side of foil band 10 by longitudinal welds 17 and 18. The foil band 10 moved in the direction of arrow 19 is then folded along its median longitudinal axis to obtain a half-hose. In this half-hose are punched out the grip apertures 20, preferably below the reinforcement. The grip apertures may however also pass through the reinforcing strips 14, 14a and the reinforcing inserts 13, 13a. Finally are effected transverse closure welds 21, 22 with an intermediate separating cut for separating the finished carrier bag from the half-hose. These transverse closure welds 21, 22 with the intermediate separating cut are arranged in the gaps 23 between the reinforcing inserts 13, 13a. As is shown in FIG. 4, the lateral edges 24, 25 of the reinforcing insert 13 are therefore spaced from the transverse closure welds 21, 22.

The reinforcing inserts 13, 13a may also be omitted since in many cases a sufficient reinforcement of the gripping edge is already obtained by the U-shaped reinforcing strips 14, 14a. This is shown by the carrier bag of FIG. 3 in which the grip apertures 20 are punched out in the reinforcement.

FIG. 5 shows a longitudinal section through the carrier bag of FIG. 4 with the walls 26, 27 of the carrier bag, the reinforcing inserts 13, 13a as well as the U-shaped foil strips 14, 14a with welds 17, 18 slid over the upper edges of each wall and reinforcing insert.

FIG. 2 shows in the upper half the folding of strip 14 separated from foil band 10 and in the lower half a particularly advantageous device for folding and applying of strip 14a. This device consists of two horizontally mounted guide rollers offset in height and of a vertical triangle arranged behind in the direction of moving foil 10 indicated by arrow 19. This triangle has to divert the horizontal strip 14a into the vertical position. The triangle is followed by a vertical guide roller and a folding channel open towards the foil band 10. The cross section of this folding channel varies continuously in such a manner that at the beginning the diverting surfaces are directed transverse to the plane of foil band 10, while in the adjacent part of the folding channel the direction of the folding surface varies continuously until it extends parallel to the foil band 10. After applying the U-shaped strips 14, 14a to the foil band 10, the edges of the strips are provided with continuous weld seams 17, 18 which connect the U-shaped strips with the foil band.

The reinforcing inserts 13, 13a may be applied to the lower side of a foil band 10. It is also possible to apply inserts 13 near the edge of directly at the edge on the upper side of a half-hose and to apply inserts 13a directly opposite on the lower side of the same half-hose.

FIG. 6 shows a carrier bag from textile material which is provided with an overlapping cover. The wall 28 of the carrier bag with the overlapping cover 29 has a reinforcing insert 13b of great width while the opposite wall 30 of the carrier bag h as a reinforcing insert 13c of smaller width. The reinforcing insert 13b is weakened about in the center in longitudinal direction, for example by a perforation 31. This weakening lies in the height of the upper edge of the front wall 30 of the carrier bag. The upper edge of the overlapping cover 29 is provided with two spaced vertical incisions 32, 33 which pass also through a part of the reinforcing insert 13b so that a hinged cover is obtained, which after closure of the carrier bag, is inserted in the grip aperture 20 of the front wall 30 and in the grip aperture 20a of the rear wall 28 whereupon the hinged cover is bent over. Thereby the bag is not only secured but the grip apertures are made more accessible because the hinged cover lies below the lower edges of the reinforcing inserts.

Figure 8:
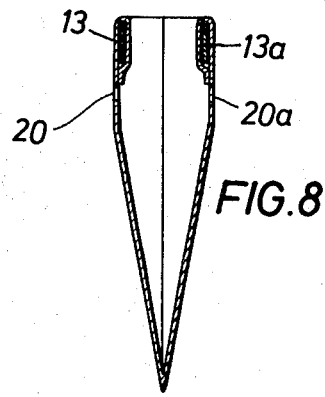
FIG. 8 is a longitudinal section of a modified carrier bag.

FIG. 8 shows a carrier bag with the reinforcing inserts 13 and 13a which are enclosed by a folded foil edge. The grip apertures 20, 20a are punched out below the reinforcing inserts in the same manner as in the carrier bag according to FIG. 6.

Figure 9:
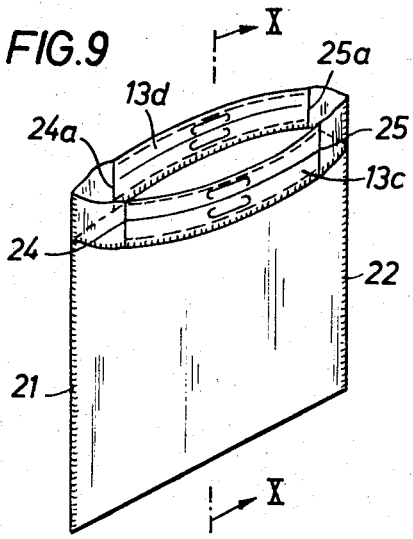
FIG. 9 is a perspective view of a further carrier bag from textile material.
Figure 10:
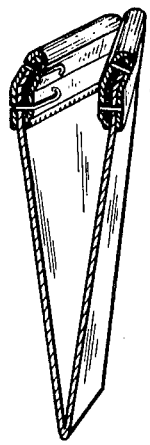
FIG. 10 is a longitudinal section on the line X–X of FIG. 9.

FIG. 9 shows a carrier bag from textile material in which the reinforcing inserts 13a, 13d of each wall have a great width. Both reinforcing inserts are weakened about in their median longitudinal line. The lateral edges 24, 25 and 24a, 25a of the reinforcing inserts 13c, 13d are arranged a greater distance from the transverse closure welds 21, 22 than heretofore, so that the edges 24, 25 may be moved away from the edges 24a, 25a in such a manner that a thick article of clothing may be inserted between these edges. The grip apertures are punched out in the reinforcing strips and in the reinforcing inserts.

There are provided two grip apertures, one below the other, since both upper edges of this carrier bag are bent over together in either direction on the weakening line of the reinforcing inserts.

Figure 11:
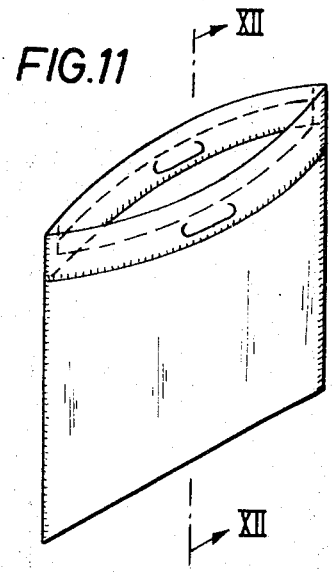
FIG. 11 is a perspective view of another modified carrier bag.
Figure 12:
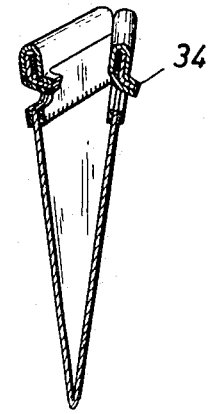
FIG. 12 is a longitudinal section on the line XII–XII of FIG. 11.

FIG. 11 shows a perspective view of a carrier bag in which the grip apertures 20, 20a of each wall of the carrier bag are punched out in the several layers of synthetic thermoplastic foil below the reinforcing inserts but within the reinforcement of the edge. By punching out the grip apertures in this manner are obtained tongues 34, which during punching with a glowing iron, are connected with one another at their edges by welding. By insertion of the hand into the grip apertures for griping of the carrier bag, these tongues are forced against the lower edge of the reinforcing inserts 13, 13a.

Figure 13:
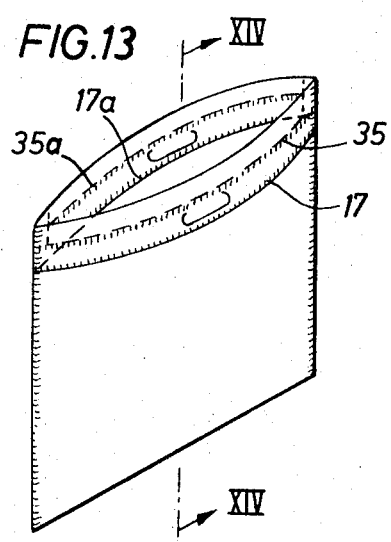
FIG. 13 is a perspective view of a further modified carrier bag.
Figure 14:
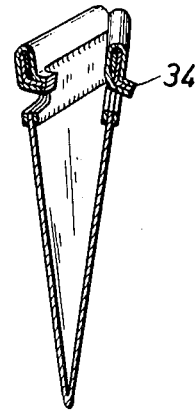
FIG. 14 is a longitudinal section on the line XIV–XIV of FIG. 13.

FIG. 13 shows that the reinforcing inserts 13, 13a are bordered by additional welds 35, 35a of the foil layers which form the reinforcement of the gripping edge. The grip apertures are punched out between these additional welds 35, 35a and the welds 17, 17a.

According to FIG. 15, the carrier bags are produced starting from a hose 10 of synthetic thermoplastic foil. The hose enables the use of a very narrow producing machine, but on a wider machine may be produced simultaneously and side by side two or more carrier bags. The hose 10 may be printed on all sides and is continuously cut open at the longitudinal edge 36 by means of a cutter 37. In a hose moving in the direction indicated by arrow 19, or in the half-hose, is effected by means of a cutter 15 passing through both walls of the hose the separation of an upper reinforcing strip 14 and of a lower reinforcing strip 14a. As is shown especially in FIG. 19, both reinforcing strips 14, 14a obtained in such a manner are then displaced in lateral direction and inserted into the half-hose, the lateral displacement corresponding to half of their width. These strips are then continuously or intermittently connected by means of longitudinal welds 17, 17a with the walls 26, 27 of the half-hose. Effecting of these longitudinal welds 17, 17a may however also be deferred until a later longitudinal welding of the reinforcing strips 14, 14a to the outer hose walls 26, 27 as described in the following. In the next working step, the reinforcing strips 14, 14a are folded for 180° towards the half-hose as shown in FIG. 20. If the carrier bags are to be used without reinforcing or carrier inserts as described in the following, the edges 38, 39 of the strips are now affixed by welding in the longitudinal direction to the outer surfaces of the hose walls which will later form the walls of the carrier bags.

If however in addition to the U-shaped reinforcing strips 14, 14a formed in the above-mentioned manner reinforcing inserts are desired to obtain a greater stiffness of the upper edge of the carrier bag so that by means of punched out grip apertures 20 passing through both hose walls, or the later walls of the carrier bag, the band may be inserted below these reinforcing inserts, reinforcing inserts 13, 13a are slid between the outer surface of hose walls 26, 27 and the folds of reinforcing strips 14, 14a as is shown particularly in FIG. 21. These reinforcing or carrier inserts are obtained by cutting off from webs 40 and 41 which are supplied in the direction indicated by arrow 42, which is transverse to the direction 19 of movement of the half-hose. The width of these reinforcing or carrier inserts is so dimensioned that they allow the above-mentioned longitudinal welds 38, 39. Their length is less than the width of the finished carrier bags so that between the serially arranged reinforcing inserts is provided a gap 23 for effecting the transverse closure welds 21, 22 with the intermediate separating cut.

When reinforcing inserts 13, 13a are used, the above-mentioned grip apertures 20 are preferably punched out below the same. The grip apertures may however also pass through the reinforcements of the upper edge of the carrier bags formed by the reinforcing strips 14, 14a if they additionally also contain the reinforcing inserts 13, 13a.

FIG. 23 shows a top view of superposed metal sheets 43, 44 overlapping one another. Metal sheet 43 is provided with a diverting edge 45 and metal sheet 44 with a diverting edge 46.

These diverting edges are preferably arranged under an angle of 45° to the direction 19 of movement of the half-hose or of the reinforcing strips 14, 14a separated therefrom. The two metal sheets 43 and 44 are relatively displaceable in their planes in the directions indicated by double arrow 47. This is effected in such a manner that metal sheet 43 is rigidly connected with a support 48 while metal sheet 44 is provided with slotted holes 49, 50 which allow its displacement.

By the displacement of metal sheet 44 relative to metal sheet 43, the distance between the diverting edges 45, 46 is varied although they are always parallel to one another. This variation of the distance is an index for lateral offsetting of strip 14 in the direction to the interior of the half-hose.

For the purpose of simplified illustration, FIGS. 23 and 24 show a support 48 which is provided only with two metal sheets 43, 44 for lateral displacement of strip 14. The same support 48 may be provided with two further metal sheets formed in the same manner for the further separated reinforcing strip 14a which is likewise displaced in the direction to the interior of the half-hose as is shown in FIG. 19.

Figure 25:
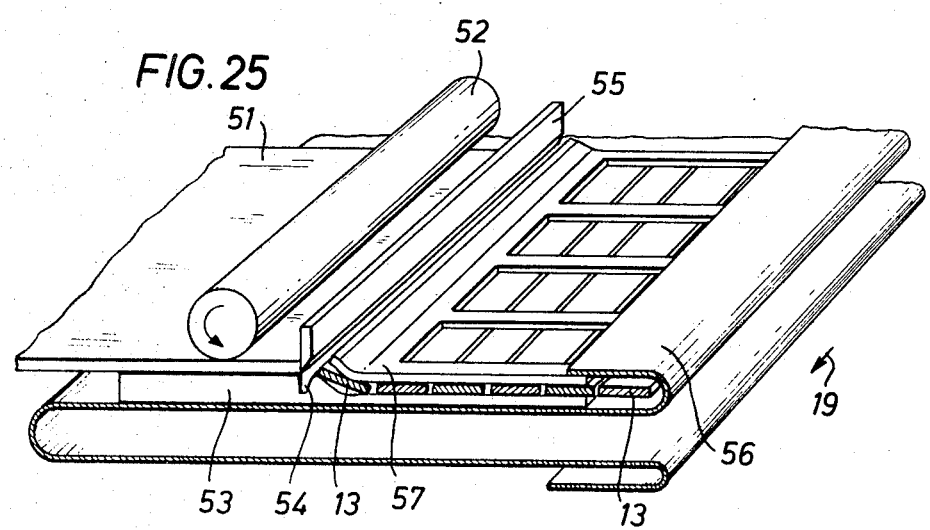
FIG. 25 shows on a larger scale and in perspective illustration the device for separating and supplying the reinforcing inserts into the space between the outer wall of the half-hose and the fold formed for the reinforcement thereof.

FIG. 25 shows the production of a carrier bag with reinforcing or carrier inserts which are slid in the same manner as according to FIG. 21 into the space between the outer hose wall 26 and the fold, but with the difference that the fold is not obtained by a strip 14 or 14a separated from the half-hose and then fixed again to the same, but by simple folding of the edge. If reinforcing or carrier inserts 13, 13a are provided, the U-shaped reinforcement of the edge as illustrated in FIGS. 15 to 22 is not absolutely necessary.

FIG. 25 shows the web 51, for example stiff cardboard, with a feed roll 52. The web 51 rests upon a support 53 provided with a counter edge 54 so that the cutter 55 may cut off the reinforcing or carrier insert 13 from the web 51. The support 53 extends into the range of the fold 56 of the reinforcement of the edge. There is further provided a feeding comb 57. The reinforcing and carrier inserts 13 are advanced between support 53 and comb 57 in such a manner that the advancing force is supplied by the feed roll 52 and that the closely abutting inserts 13 are intermittently advanced the width thereof. The support 53 and the comb 57 are stationary. The hose with its fold 56 moves intermittently in the direction indicated by arrow 19. For the purpose of simplified illustration, the supply of carrier inserts 13 is shown only on the upper side. It is provided in the same manner also on the lower side of the half-hose.

Figure 26:
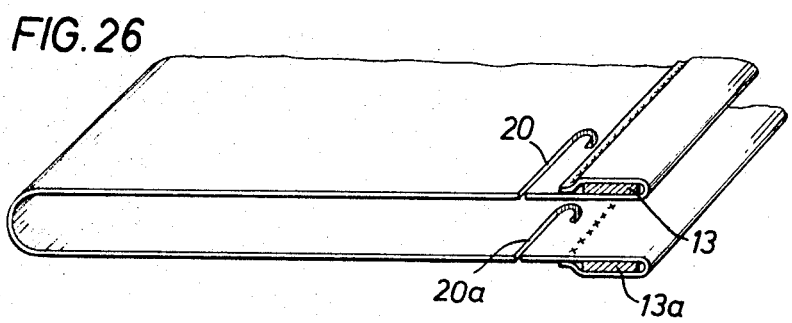
FIG. 26 is in partial view and perspective illustration of another carrier bag according to the invention.

FIG. 26 shows part of a carrier bag produced by means of the device according to FIG. 25.

Figure 27:
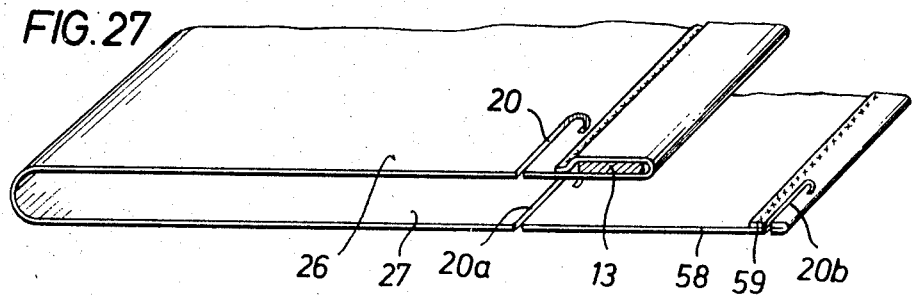
FIG. 27 is in partial view and perspective illustration of a modified carrier bag with an overlapping cover.

FIG. 27 shows a carrier bag modified over FIGS. 25 and 26 in such a manner that the same has only one carrier insert 13 and is formed as a carrier bag with an overlapping cover 58. The edge of the overlapping cover is provided with a simple fold 59 in which is punched out the grip aperture 20b. If the carrier bag is closed, this grip aperture 20b is aligned with the two other grip apertures 20 and 20a which are punched out in the two walls 26, 27 below the reinforcing insert 13. Since the overlapping cover 58 engages over the carrier insert 13 when the carrier bag is closed, only one carrier insert is necessary so that the carrier bag may be produced from a smaller number of parts.

We claim:

1. In a method of continuously producing carrier bags from synthetic thermoplastic foil with a reinforcement at the upper edges of each carrier bag and with punched out grip apertures passing through both walls of each carrier bag, the improvement comprising the steps of providing two continuous longitudinal strips of synthetic thermoplastic foil; continuously folding each said strip along its longitudinal median axis into a U-shape and continuously inserting a longitudinal edge of a folded synthetic thermoplastic foil band in each said U-shape strip up to the longitudinal median axis; welding the edges of each said U-shape strip to said foil band; punching said grip apertures; and cutting and welding transverse said foil band to form the finished carrier bag.

2. A method according to claim 1, comprising the further steps of cutting said longitudinal strips from the longitudinal edges of said foil band and folding them over the cut edges of said foil band; folding said foil band over onto itself along its longitudinal median line; and applying intermittently spaced reinforcing inserts juxtaposed at least one longitudinal edge of said foil band so that they are continuously covered by said folded longitudinal strip, the edges of which strip are continuously welded to said foil band, and said cutting and welding transverse to said foil band is performed in the gaps between said spaced reinforcing inserts.

3. A method according to claim 2, wherein said reinforcing inserts are applied to said foil band at a distance from its longitudinal edges of double the width of said insert.

4. A method according to claim 2, wherein said reinforcing inserts are applied to both longitudinal edges of said foil band, and the insert applied to one said edge is of double width relative the insert applied to the other said edge.

5. A method according to claim 1, wherein the initial synthetic thermoplastic foil band is in the form of a hose and including the further step of longitudinally cutting said hose to form the folded foil band; cutting said longitudinal strips from both longitudinal edges of said folded foil band; sliding said longitudinal strips into said folded band by half their width and folding the other half of said strips 180° around the cut edges on said folded foil band; and then continuously longitudinally welding said folded strips to said folded foil band.

6. A method according to claim 5, comprising the further steps of intermittently inserting spaced reinforcing inserts between said folded foil band and said folded strips before said strips are welded, said inserting occurring in a direction transverse to a direction of movement of said folded foil band, said inserts having been cut off from a web of material the width of which corresponds to desired length of said reinforcing inserts and the length of said reinforcing inserts being so dimensioned that it is shorter than the final width of the carrier bags, so that said intermittently spaced reinforcing inserts have a gap therebetween in which said transverse closure weld with an intermediate separating cut are effected for separating the finished carrier bag.